July 2, 1957  A. ROSS ET AL  2,797,650
RAILWAY VEHICLE
Filed Dec. 26, 1951  2 Sheets-Sheet 1
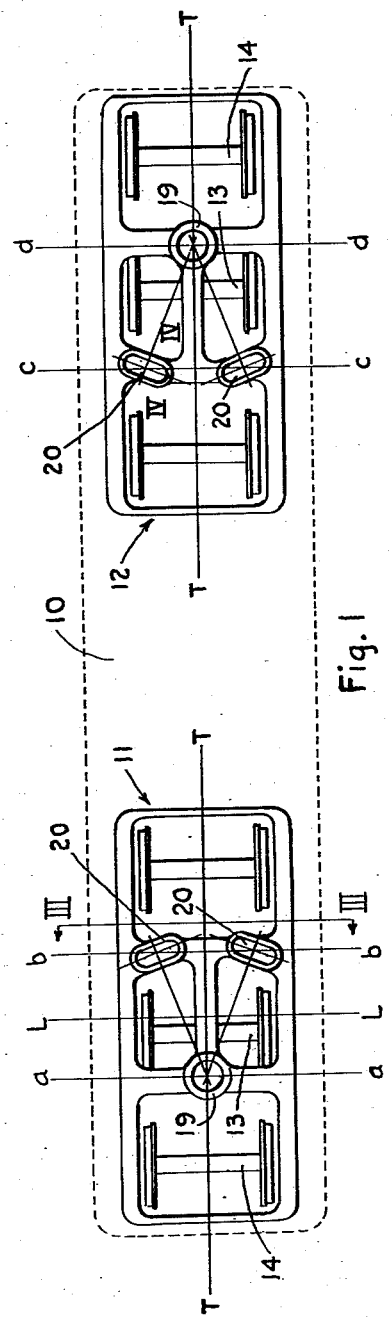
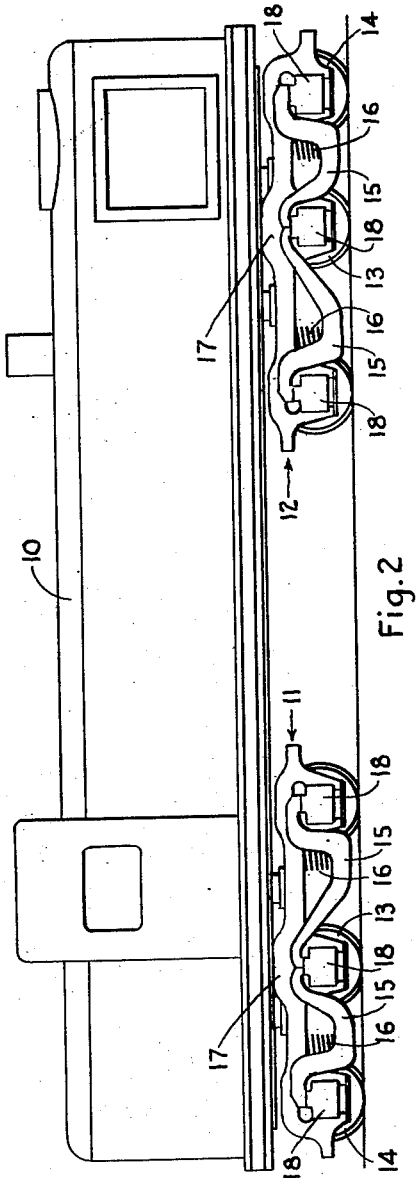
ALEXANDER ROSS
INVENTOR
BY Maurice W. Grady
ATTORNEY July 2, 1957 A. ROSS ET AL 2,797,650
RAILWAY VEHICLE Filed Dec. 26, 1951 2 Sheets-Sheet 2

ALEXANDER ROSS
INVENTOR

BY *Maurice W. Grady*
ATTORNEY

United States Patent Office 2,797,650
Patented July 2, 1957

2,797,650

RAILWAY VEHICLE

Alexander Ross, Schenectady, N. Y., and Adelbert C. Wintemberg, Drexel Hill, and Thomas R. Gilchrist, Yeadon, Pa., assignors to Alco Products, Inc., New York, N. Y., a corporation of New York Application December 26, 1951, Serial No. 263,278

7 Claims. (Cl. 105—196)

This invention relates to railway vehicles and particularly to vehicles such as diesel electric locomotives.

The principal object of the invention is to provide a railway vehicle in which the superstructure is supported directly upon its trucks without the interposition of springs so that the superstructure load is transmitted to the trucks solely on solid bearing surfaces. Another object is to provide such a vehicle in which the superstructure rests upon its trucks solely by means of three point supports on each truck, no springs or similar resilient means being employed between the trucks and superstructure with the result that all rail shocks imparted to the running locomotive will be absorbed solely by the spring elements within the trucks. Still another object is to design such a vehicle, particularly a diesel electric locomotive, employing a three point non-resilient or solid support between each truck frame and the superstructure, one of the three supporting points on each truck being a conventional center plate disposed on the outboard side of the transverse center line of the truck and the other two points being symmetrically disposed on the inboard side of such center line and comprising bearings secured to the underside of the superstructure and adapted to slide radially about the center point of the center plate on pads formed on top of the truck frame. Another object is to provide a locomotive in which the superstructure is supported upon three point springless or non-resilient solid means disposed on each of two six-wheel, three-axle trucks, thus avoiding all relative movements, including side roll, between the superstructure and each truck resulting from riding shocks. Other and further objects of the invention will be apparent from the following description, the accompanying drawings, and the appended claims.

Figure 3:
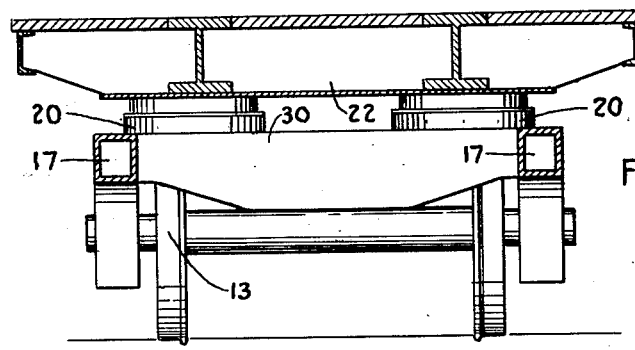
Figure 4:
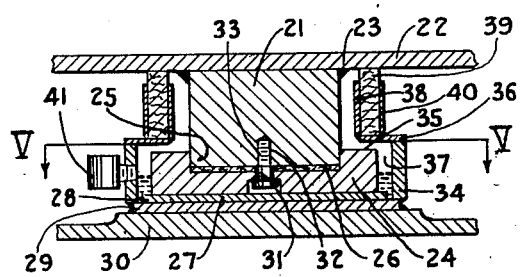

In the accompanying drawings, Fig. 1 is a plan view of the invention in which the trucks are shown diagrammatically by the full lines and the outline of the superstructure by the dotted lines. Fig. 2 is a side view in elevation in which the trucks are also shown diagrammatically. Fig. 3 is a cross section in elevation, to an enlarged scale, taken on the line III—III of Fig. 1. Fig. 4 is a cross section through one of the sliding pads to an enlarged scale, taken on the line IV—IV of Fig. 1, and Fig. 5 is a plan view to an enlarged scale taken on the line V—V of Fig. 4 and showing the maximum sliding movement of the bearing in dotted lines.

Referring now to the drawings, superstructure 10 of a railway vehicle (here shown as a diesel electric locomotive of the heavy switcher type) is supported by two trucks, generally indicated as 11 and 12. The trucks shown are of the six-wheel, three-axle type. The middle wheel and axle assembly 13 of each truck is unequally spaced from the other wheel and axle assemblies and is arranged nearer to the outboard assembly 14. Such an arrangement allows for the employment of three axle hung electric motors (not shown) and is more fully described in a co-pending application of the inventor herein, such application bearing Serial No. 242,213, filed August 17, 1951. Conventional equalizers 15 and springs 16 are provided to support the truck frame 17 upon the journal boxes 18. Although the design of the invention is here illustrated as applied to a locomotive, it can be employed in connection with other railway vehicles such as a passenger coach.

Superstructure 10, as best seen in Fig. 1, is supported upon each truck by three point bearings comprising an outboard center plate bearing 19 and side bearing sliding pads 20, hereafter more fully described. Each center plate 19 is disposed outboard of the transverse center line L of its truck and each pair of side bearings 20 is disposed inboard of such center line. The individual side bearings are symmetrically disposed in reference to the truck's longitudinal center line T. The center plates are conventional; and the side bearings have no springs or other resilient elements, as will later appear. It is evident, therefore, that the superstructure is directly and continuously supported by the three bearings without the interposition of springs or other resilient means. This is a departure from conventional designs in which the side bearings are normally slightly spaced vertically from the superstructure or are provided with springs so that the superstructure is allowed some roll free and then against solid or resilient opposition.

Figure 5:
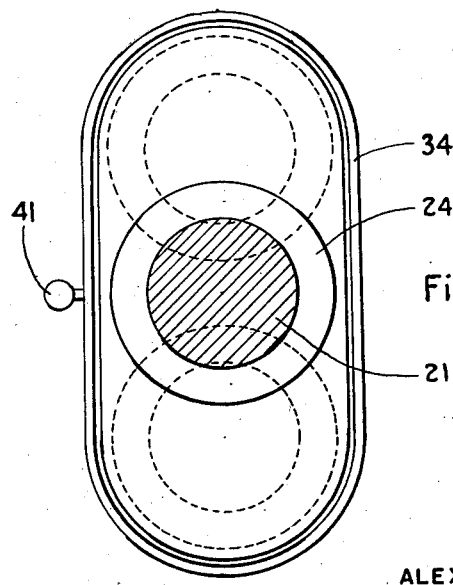

Referring now to Figs. 3, 4, and 5 for a more detailed description of the side bearings 20, it will be seen that each unit includes a cylindrical block 21 dependent from the frame 22 to which it is welded as at 23. Receiver 24 is formed with a central circular recess 25 into which block 21 extends in sliding telescopic relation. Between block 21 and the bottom of recess 25 is interposed a relatively thin liner 26 of shock absorbing material of slow compressibility. Receiver 24 rests upon a wearing liner 27 of hard steel which in turn rests upon a steel plate 28 welded at 29 to the truck bolster 30. Receiver 24 has a counterbored central aperture 31, and block 21 has a threaded central aperture 32 in alignment with aperture 31 for the reception of a retaining screw bolt 33.

Plate 28 and liner 27 are elongated with parallel sides and arcuate ends thus providing a bearing surface dimensioned to allow for the extremes of travel of the receiver as the superstructure may move in reference to the truck under operating conditions. Welded to and continuing completely around the margins of plate 28 is an upwardly extending flange 34 of a height slightly greater than the top surface 35 of receiver 24. Capping flange 34 is a cover plate 36 defining a central opening 37 dimensioned to provide sufficient clearance for the travel requirements of receiver 24. To the inner edge of plate 36 and completely surrounding it is welded an upstanding thin metallic sheet 38 against which is fitted a band 39 of sealing material such as felt which extends from cover plate 36 to underframe 22. Band 39 is secured to sheet 38 by strap 40. It is apparent that the assembly of elements comprising flange 34, cover plate 36, sheet 38, and band 39 forms a receptacle for oil introduced through the oil cup 41 to lubricate the bearing surface of plate 28. Although lubrication is thus provided, the friction developed between receiver 24 and liner 27 will be high when one member moves with reference to the other so that great resistance to lateral movement of the superstructure is created.

Each side bearing plate 28 is so arranged that its axis of elongation is perpendicular to the radius extending from its center to the center of center plate 19. It should also be noted that there is considerable longitudinal difference in the positions of the center plate in relation to each pair of side bearings. In the illustrative embodiment, this difference is approximately one third the length of the truck. As the result of the disposition of the center plate and side bearing plates, it is apparent that broad and stable supporting bases for the ends of the superstructure are produced in the space between the lines a—a and b—b of truck 11 and in the space between the lines c—c and d—d of truck 12. Acting together, these bases impart longitudinal stability for the superstructure. It is also obvious that no lateral roll is permitted as is conventional.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What we claim is:

1. A railway vehicle comprising a superstructure, a pair of supporting trucks each having a unitary frame resiliently supported by the wheel and axle assemblies, and three bearing surfaces on the frame forming a solid support between the superstructure and truck frame, said bearing surfaces including a center plate disposed outboard of the transverse center line of the truck, a pair of plates disposed inboard of such transverse center line and symmetrically in relation to the longitudinal center line of the truck and laterally thereof, and means extending downwardly from the superstructure to rest upon such inboard plates, said means sliding in reference to the plates as the superstructure may move laterally under vehicle rolling conditions.

2. A railway vehicle comprising a superstructure, a pair of supporting trucks each having a unitary frame resiliently supported by the wheel and axle assemblies, and three bearing superstructure-supporting means on each truck frame forming a solid support between the superstructure and truck frame, said bearing means including a rotary center plate disposed outboard the transverse center line of the truck and upon the longitudinal center line thereof, a pair of bearings disposed inboard the transverse center line of the truck symmetrically in relation to the longitudinal center line of the truck, and elements dependent from the superstructure to slidably rest upon said inboard bearings to support the superstructure but to allow the superstructure to rotate about the center plate under vehicle rolling conditions.

3. In a railway vehicle of the class comprising a superstructure and a pair of supporting trucks each having a unitary frame resiliently supported by the wheel and axle assemblies, three point superstructure-supporting bearing means on each truck frame forming a solid support between the superstructure and truck frame comprising a center plate on each truck frame disposed outboard of the transverse center line of the truck, a pair of plates on each truck frame disposed inboard of the transverse center line and symmetrically in reference to the longitudinal center line of the truck, and a receiver slidable on each inboard plate and formed to receive a dependent element of the superstructure in telescopic bearing relation.

4. In a railway vehicle of the class comprising a superstructure and a pair of supporting trucks each having a unitary frame resiliently supported by the wheel and axle assemblies, three point superstructure-supporting bearing means on each truck frame forming a solid support between the superstructure and truck frame comprising a center plate outboard of the transverse center line of the truck, a pair of bearing plates disposed inboard of the transverse center line of the truck and symmetrically in reference to the respective longitudinal center line thereof, a receiver supported on each inboard bearing plate, and elements on the superstructure telescoped into the receivers to provide solid support for the superstructure, said receivers being movable in a horizontal plane on the supporting plates as the superstructure may move laterally about the center plate.

5. In a railway vehicle of the class comprising a superstructure and a pair of supporting trucks each having a unitary frame resiliently supported by the wheel and axle assemblies, three point superstructure-supporting bearing means on each truck frame forming a solid support between the superstructure and truck frame comprising a center plate outboard of the transverse center line of the truck, a pair of elongated bearing plates on each frame disposed inboard of the transverse center line of the trucks symmetrically in reference to the respective longitudinal center lines thereof, a receiver supported on each inboard plate, a frictional liner between the receiver and its plate, and elements on the superstructure telescoped into the receiver to provide support for the superstructure, each receiver being movable in a horizontal plane in reference to its supporting plate as the superstructure may move laterally relative to the truck about the center plate, said frictional liners offering lateral resistance to such relative movement of the superstructure.

6. A railway vehicle comprising a superstructure, a pair of supporting trucks each having a unitary frame resiliently supported by the wheel and axle assemblies, and superstructure-supporting means on each truck frame consisting of three bearing surfaces forming a solid support between the superstructure and truck frame, one of which is a center plate disposed outboard of the transverse center line of the truck and upon the longitudinal center line thereof and the other two of which are disposed inboard of such transverse center line and symmetrically in relation to the longitudinal center line of the truck.

7. A railway vehicle comprising a superstructure, a pair of supporting trucks each having a unitary frame resiliently supported by the wheel and axle assemblies, three bearing surfaces on each truck frame to support the superstructure and forming a solid support between the superstructure and truck frame, said bearing surfaces including a center plate disposed outboard of the transverse center line of each truck and on the longitudinal center line thereof and bearing plates disposed inboard of said transverse center line symmetrically in reference to the longitudinal center line, a recessed receiver slidably supported by said bearing plates, and elements extending from the superstructure into the receivers in telescopic relation, said receivers providing a solid bearing support to the elements telescoped therein and sliding on their respective bearing plates as the superstructure may move laterally in reference to the truck about the center plate.

References Cited in the file of this patent

UNITED STATES PATENTS

| 975,303 | Vauclain | Nov. 8, 1910 |
| 1,331,887 | Van Dyke | Feb. 24, 1920 |
| 1,895,500 | Todd | Jan. 31, 1933 |

FOREIGN PATENTS

| 147,652 | Switzerland | Sept. 1, 1931 |